US006547421B2

(12) United States Patent
Sugano

(10) Patent No.: US 6,547,421 B2
(45) Date of Patent: Apr. 15, 2003

(54) DISPLAY APPARATUS

(75) Inventor: Yasuyuki Sugano, Gunma (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/867,220

(22) Filed: May 29, 2001

(65) Prior Publication Data

US 2001/0048560 A1 Dec. 6, 2001

(30) Foreign Application Priority Data

May 31, 2000 (JP) .......................... 2000-163345

(51) Int. Cl.[7] .............................. F21V 5/04; G02B 27/12
(52) U.S. Cl. ..................... 362/268; 362/244; 362/331; 362/19; 359/619
(58) Field of Search .......................... 362/19, 244–246, 362/268, 331, 551, 561, 800; 359/618, 619, 621–623; 353/20, 48, 89, 94, 98

(56) References Cited

U.S. PATENT DOCUMENTS

| 6,038,005 | A | * | 3/2000 | Handschy et al. | 359/619 |
| 6,075,648 | A | * | 6/2000 | Yamamoto et al. | 359/619 |
| 6,089,720 | A | * | 7/2000 | Sawai | 353/98 |
| 6,222,674 | B1 | * | 4/2001 | Ohta | 359/618 |
| 6,341,876 | B1 | * | 1/2002 | Moss et al. | 362/268 |

* cited by examiner

Primary Examiner—Alan Cariaso
(74) Attorney, Agent, or Firm—Jay H. Maioli

(57) ABSTRACT

A video display apparatus which exhibits high utilization efficiency of a luminous flux from a light source and can provide a uniform video. The video display apparatus includes a light source unit including a plurality of coupling optical elements for converting light emitted from a plurality of light sources into a substantially parallel luminous flux and operable to condense light having passed through the coupling optical elements at a predetermined position, an optical integrator for equalizing the intensity distribution of the condensed light, and a light valve.

9 Claims, 17 Drawing Sheets

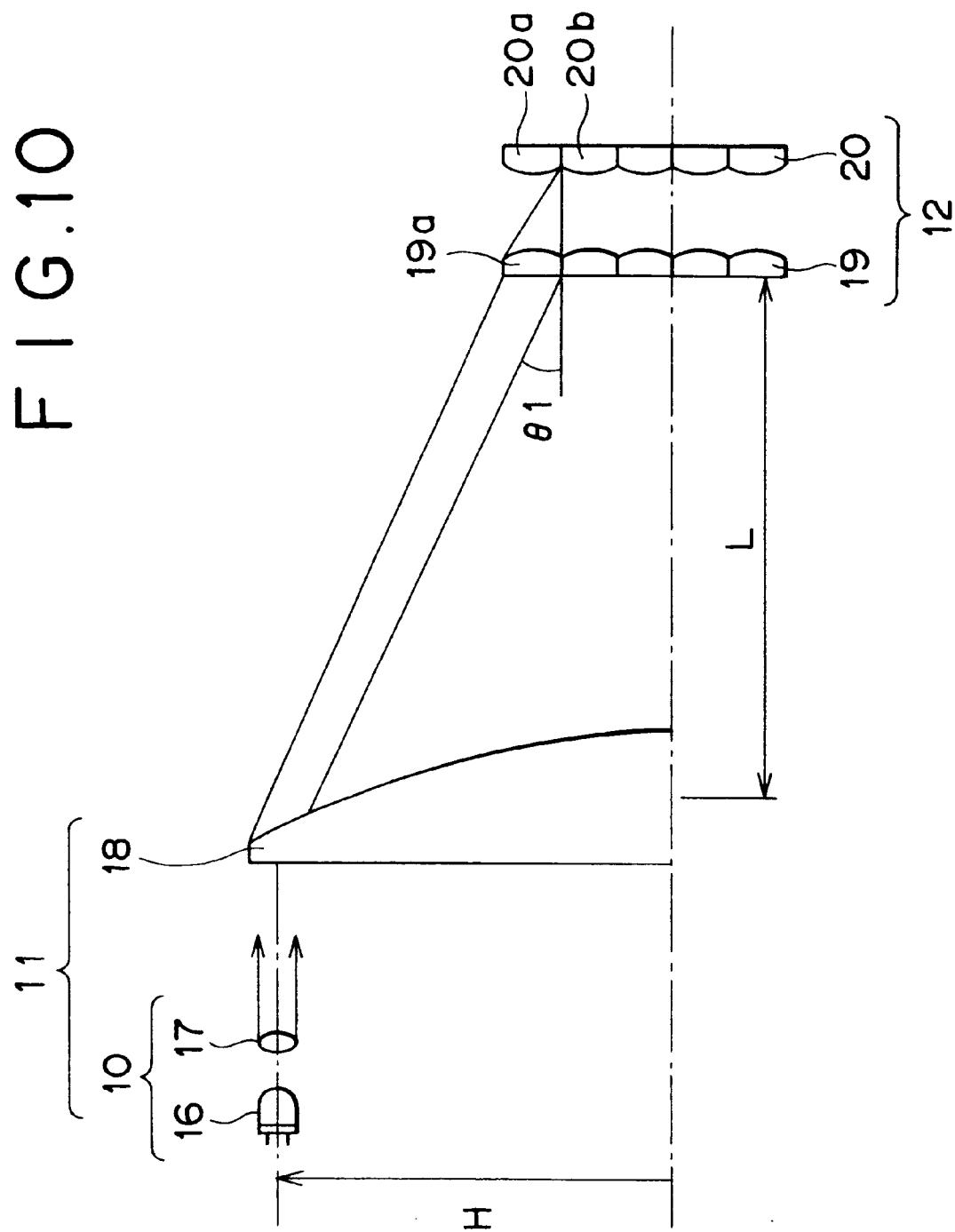

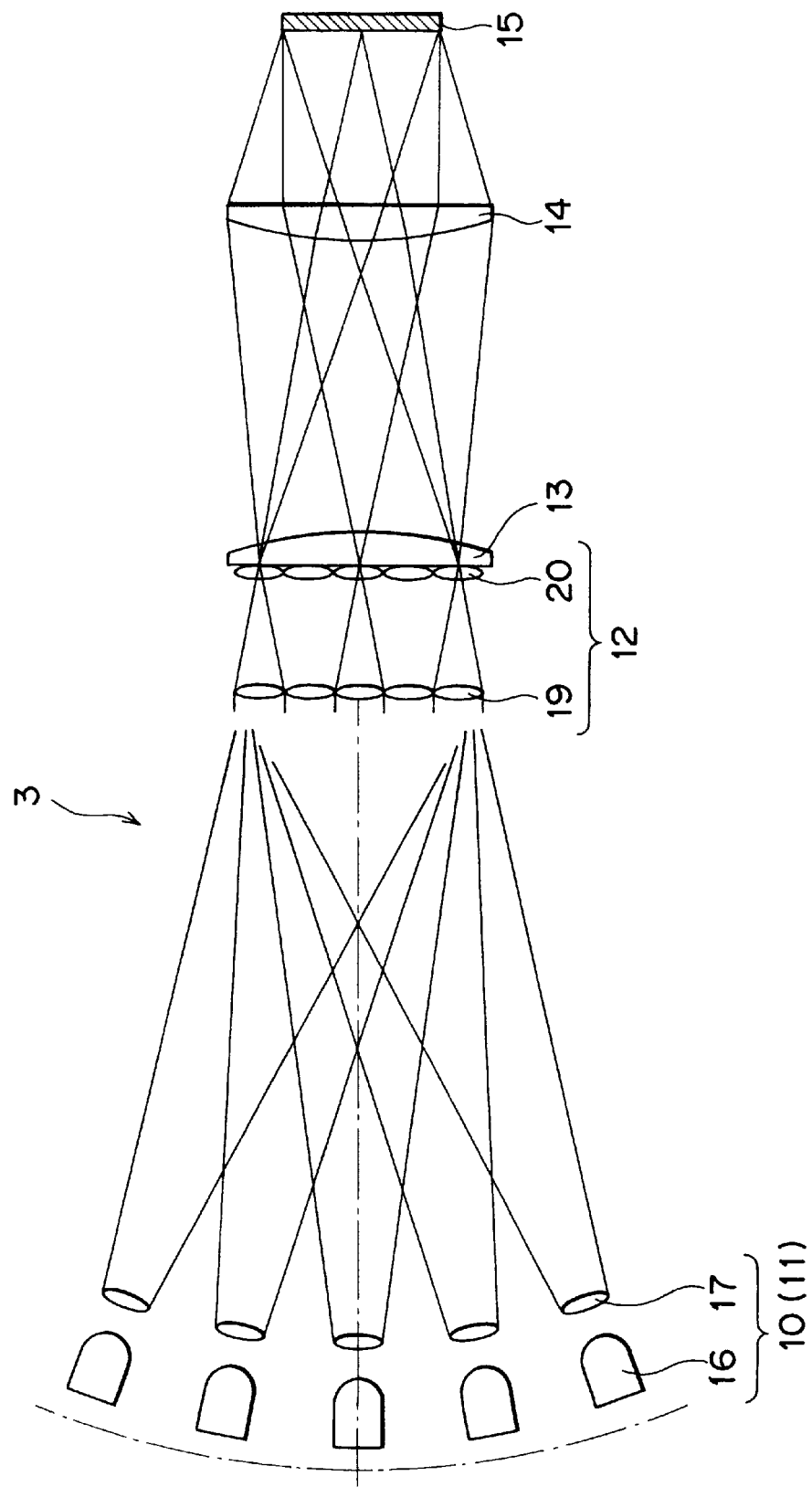

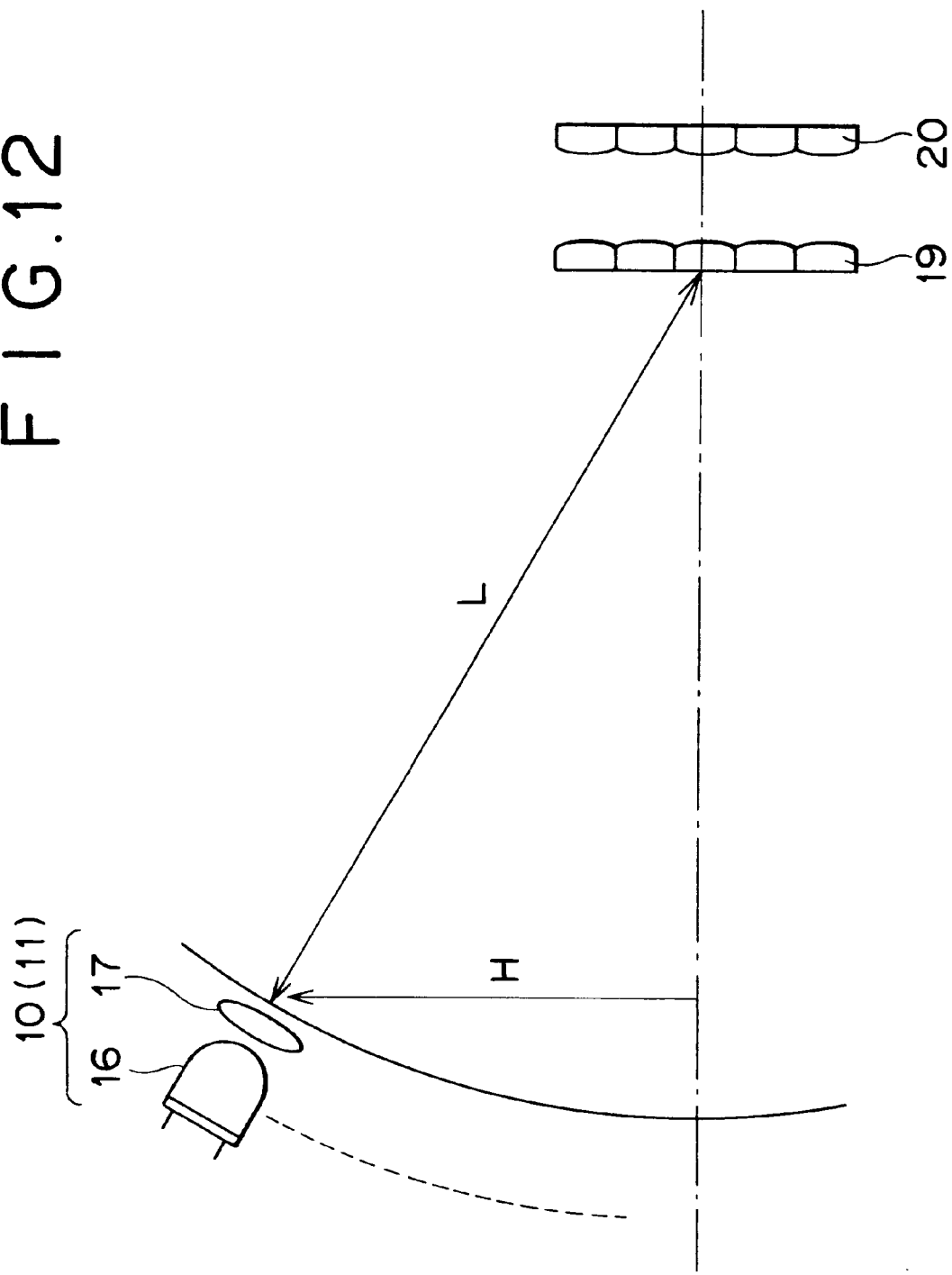

DISPLAY APPARATUS

BACKGROUND OF THE INVENTION

This invention relates to a video display apparatus for projecting a still picture or a moving picture with a high color reproduction capability.

A video display apparatus of the projection type which uses light emitted from a light source to project and display a still picture or a moving picture upon a screen is conventionally used practically.

Typically, a video display apparatus of the projection type which is conventionally used widely has such a configuration as shown in FIG. 1. Referring to FIG. 1, the video display apparatus of the projection type includes a reflecting plate 100 having a reflecting surface of a shape of a paraboloid of revolution, a light source 101 disposed at a focus position of the reflecting plate 100, an integrator 102, a red separating mirror 103R, a green separating mirror 103G, a reflecting mirror 103B, and a color synthesizing prism 104 having a cubic shape.

The video display apparatus further includes a reflecting mirror 105R for reflecting red light reflected by the red separating mirror 103R so as to be introduced into a predetermined surface 104R of the color synthesizing prism 104, and a reflecting mirror 105B for reflecting blue light reflected by the reflecting mirror 103B so as to be introduced into another surface 104B of the color synthesizing prism 104 parallel to the surface 104R. The color synthesizing prism 104 is disposed such that green light reflected by the green separating mirror 103G is introduced into a surface 104G thereof perpendicular to the surface 104R and the surface 104B. A pair of optical path length adjusting lenses 106 and 107 are disposed between the green separating mirror 103G and the reflecting mirror 103B and between the reflecting mirror 103B and the reflecting mirror 105B, respectively.

The video display apparatus further includes a red light valve 108R interposed between the reflecting mirror 105R and the surface 104R of the color synthesizing prism 104, a red lens 109R interposed between the reflecting mirror 105R and the red light valve 108R, a green light valve 108G interposed between the green separating mirror 103G and the surface 104G of the color synthesizing prism 104, a green lens 109G disposed between the green separating mirror 103G and the green light valve 108G, a blue light valve 108B interposed between the reflecting mirror 105B and the surface 104B of the color synthesizing prism 104, and a blue lens 109B interposed between the reflecting mirror 105B and the blue light valve 108B.

The video display apparatus further includes a projector lens 110 disposed in an opposing relationship to a still further surface of the color synthesizing prism 104 parallel to the surface 104G.

In the conventional video display apparatus having the configuration described above, a white light lamp such as a xenon lamp or a metal halide lamp is used for the light source 101. Light emitted from the light source 101 is reflected by the reflecting plate 100 and is then introduced into the red separating mirror 103R through the integrator 102 after ultraviolet rays and infrared rays are removed from the light by a cut filter apparatus not shown. Of the light introduced into the red separating mirror 103R, a red light component is reflected by the red separating mirror 103R and the reflecting mirror 105R and then passes through the red lens 109R and the red light valve 108R so that it is introduced into the color synthesizing prism 104. The other color light components of the light introduced into the red separating mirror 103R than the red light pass through the red separating mirror 103R and are introduced into the green separating mirror 103G.

Of the light introduced into the green separating mirror 103G, a green light component is reflected by the green separating mirror 103G and introduced into the color synthesizing prism 104 through the green lens 109G and the green light valve 108G. The other color light component of the light introduced into the green separating mirror 103G than the green light passes through the green separating mirror 103G and is introduced into the reflecting mirror 103B through the optical path length adjusting lens 106.

The light introduced into the reflecting mirror 103B, that is, the blue light component, is reflected by the reflecting mirror 103B and passes through the optical path length adjusting lens 107, whereafter it is reflected further by the reflecting mirror 105B and then introduced into the color synthesizing prism 104 through the blue lens 109B and the blue light valve 108B.

The color light components introduced into the color synthesizing prism 104 are synthesized by the color synthesizing prism 104 and projected onto a screen of the transmission type or the reflection type through the projector lens 110.

In the conventional video display apparatus, since single kind of light source is used by itself for the light source 101, wavelengths included in light emitted from the light source 101 are somewhat one-sided, and therefore, it is difficult to obtain a well-balanced light amount ratio of the three color light components separated by the color separating mirrors 103R and 103G and the reflecting mirror 103B. Therefore, it is difficult to augment the color reproducibility of the conventional video display apparatus. Further, since a white light lamp which is used in the conventional video display apparatus exhibits difficulty in adjustment of the brightness with a high degree of accuracy and emits light with a fixed brightness, it is difficult to adjust the brightness for each of the color light components of red, green and blue independently of each other.

Further, in the conventional video display apparatus, a luminous flux emitted from a white light lamp used as the light source 101 has a circular cross section. In contrast, the light valves 108R, 108G and 108B upon which the light is irradiated normally have a rectangular shape. Accordingly, in order to introduce the light uniformly to the light valves 108R, 108G and 108B, the diameter of the luminous flux incident to each light valve is set greater than the length of a diagonal line of each light valve. Consequently, there is a problem that the irradiation efficiency of the light irradiated from the light source 101 is low.

Thus, another video display apparatus has been proposed which uses a plurality of lamps for its light source or a plurality of semiconductor light emitting elements such as light emitting diodes or laser diodes for each of the three primary colors.

FIG. 2 shows an XY chromaticity diagram indicating color reproduction ranges by a phosphor of a CRT (Cathode Ray Tube), a video display apparatus which uses a light emitting diode and a display apparatus of the NTSC (National Television System Committee) system. It can be seen from the XY chromaticity diagram that, where the light emitting diode is used for the light source, the color reproduction range is greater than the color reproduction range of the phosphor of a CRT or a display apparatus of the NTSC system.

However, since rays of light emitted from a plurality of light sources have angles, non-axial light from outside an optical axis is produced. If non-axial light is included in the light emitted from the light sources, it is difficult to irradiate the light uniformly upon a light valve. Further, since the light is irradiated to the outside of the light valve, also the irradiation efficiency of light is deteriorated disadvantageously.

SUMMARY OF THE INVENTION

It is an object of the present invention to provide a video display apparatus wherein, where a plurality of kinds of white light lamps or a plurality of semiconductor light emitting elements having a good color purity are used for a light source, light emitted from the light source can be introduced uniformly and efficiently to a light valve.

In order to attain the object of the present invention, there is provided a video display apparatus which includes a light source unit, an integrator, and a light valve. The light source unit includes a plurality of light source sections each including a light source formed from a semiconductor light emitting element or a white light lamp and a coupling optical element for converting light emitted from the light source sections into substantially parallel light, and is operable to condense light from the light source sections having passed through the coupling optical elements at a predetermined focus position on an optical axis of the entire illuminating system. The integrator is disposed at the focus position of the light source unit and uniformizes an intra-plane light intensity distribution of the light emitted from the light source unit. The light valve has a substantially rectangular shape, and the light whose intra-plane light intensity distribution has been uniformed by the integrator is irradiated upon the light valve.

With the video display apparatus, since light emitted from the plurality of light source sections is condensed and introduced into the light valve, when necessary, the number of light source sections can be increased to increase the light amount readily. Further, since light from the plurality of light source sections is condensed at the predetermined focus position on the optical axis of the entire illuminating system and the integrator is disposed at the focus position, the light can be irradiated uniformly upon the light valve, and the light emitted from the light source sections can be introduced efficiently into the light valve.

A well-balanced light amount ratio of the three primary colors can be obtained and adjustment of the brightness can be performed with a high degree of accuracy using a plurality of different types of white light lamps or a plurality of semiconductor light emitting elements of good color impurity. Accordingly, the video display apparatus can be formed so as to exhibit a high brightness, a superior color reproducibility and a high performance.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is a diagrammatic view illustrating a positional relationship between a light source section and an integrator where the video display apparatus of FIG. 3 includes a condenser lens;

FIG. 11 is a diagrammatic view showing the video display apparatus of FIG. 3 where a plurality of light source sections are disposed on a semi-sphere without provision of a condenser lens;

FIG. 12 is a diagrammatic view illustrating a positional relationship between a light source section and an integrator where the video display apparatus of FIG. 3 does not include a condenser lens;

DESCRIPTION OF THE PREFERRED EMBODIMENTS

Figure 1:
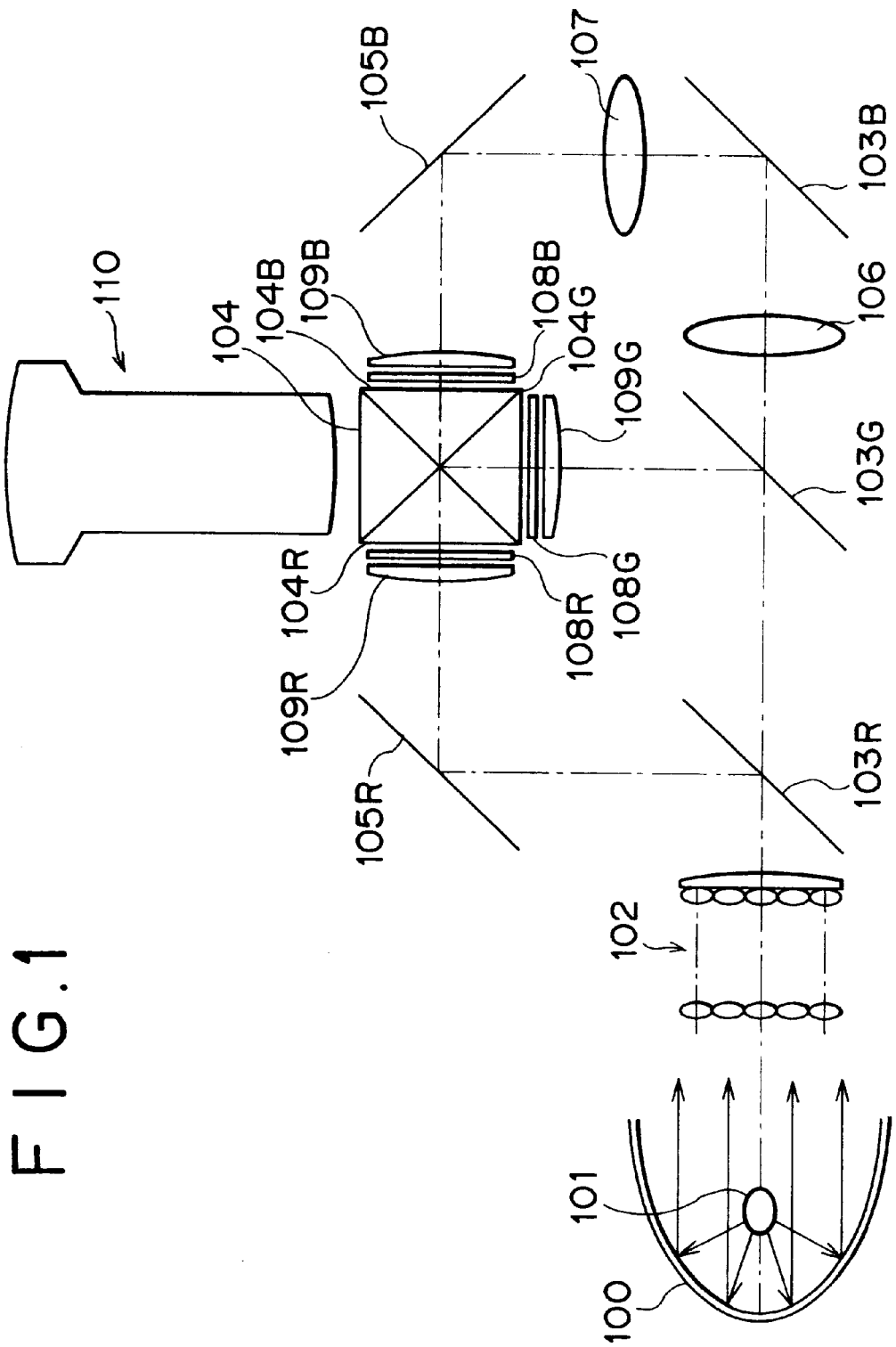
FIG. 1 is a schematic view showing a conventional video display apparatus of the projection type.
Figure 2:
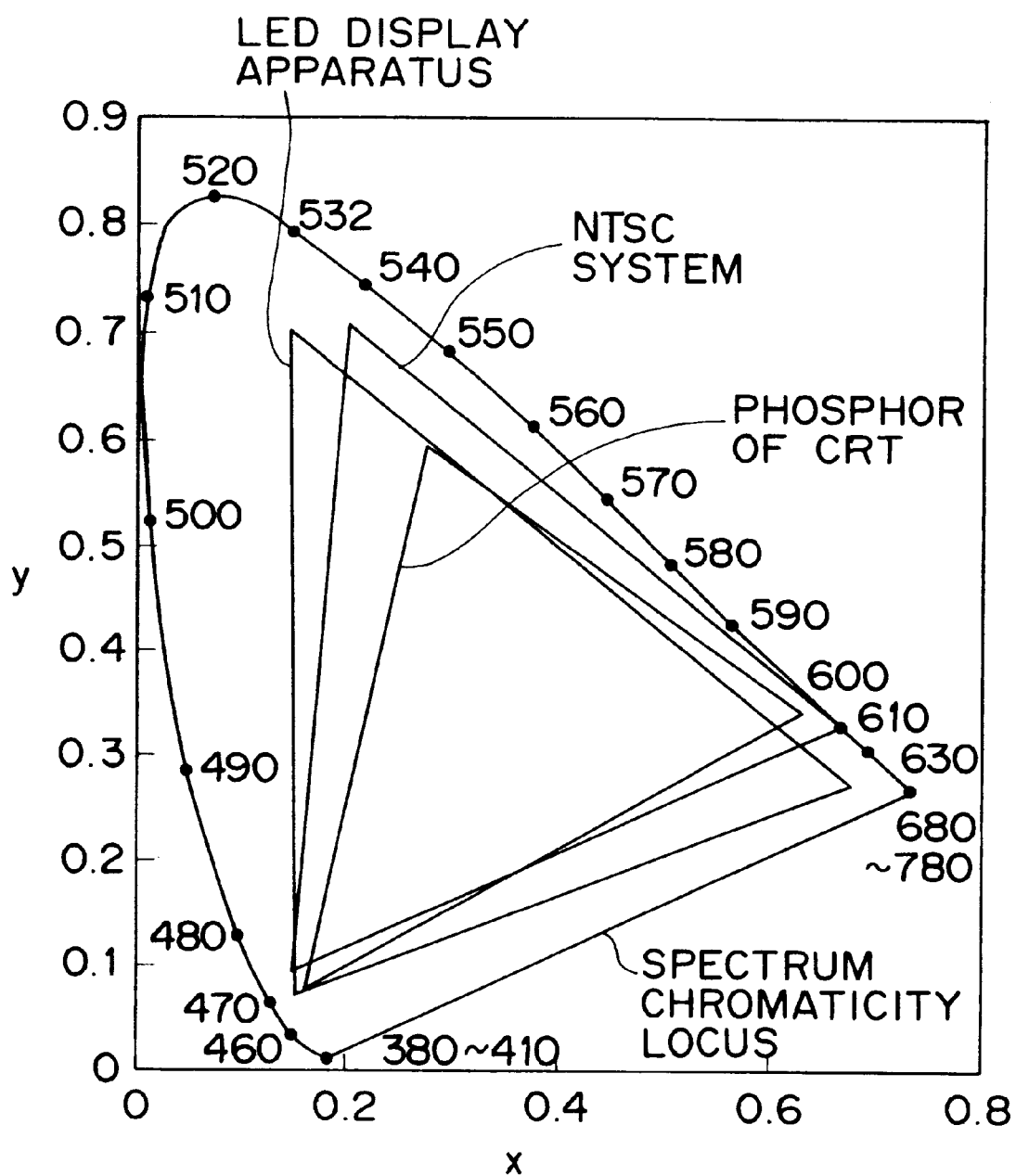
FIG. 2 is a diagram illustrating color reproduction ranges of different conventional video display apparatus.
Figure 3:
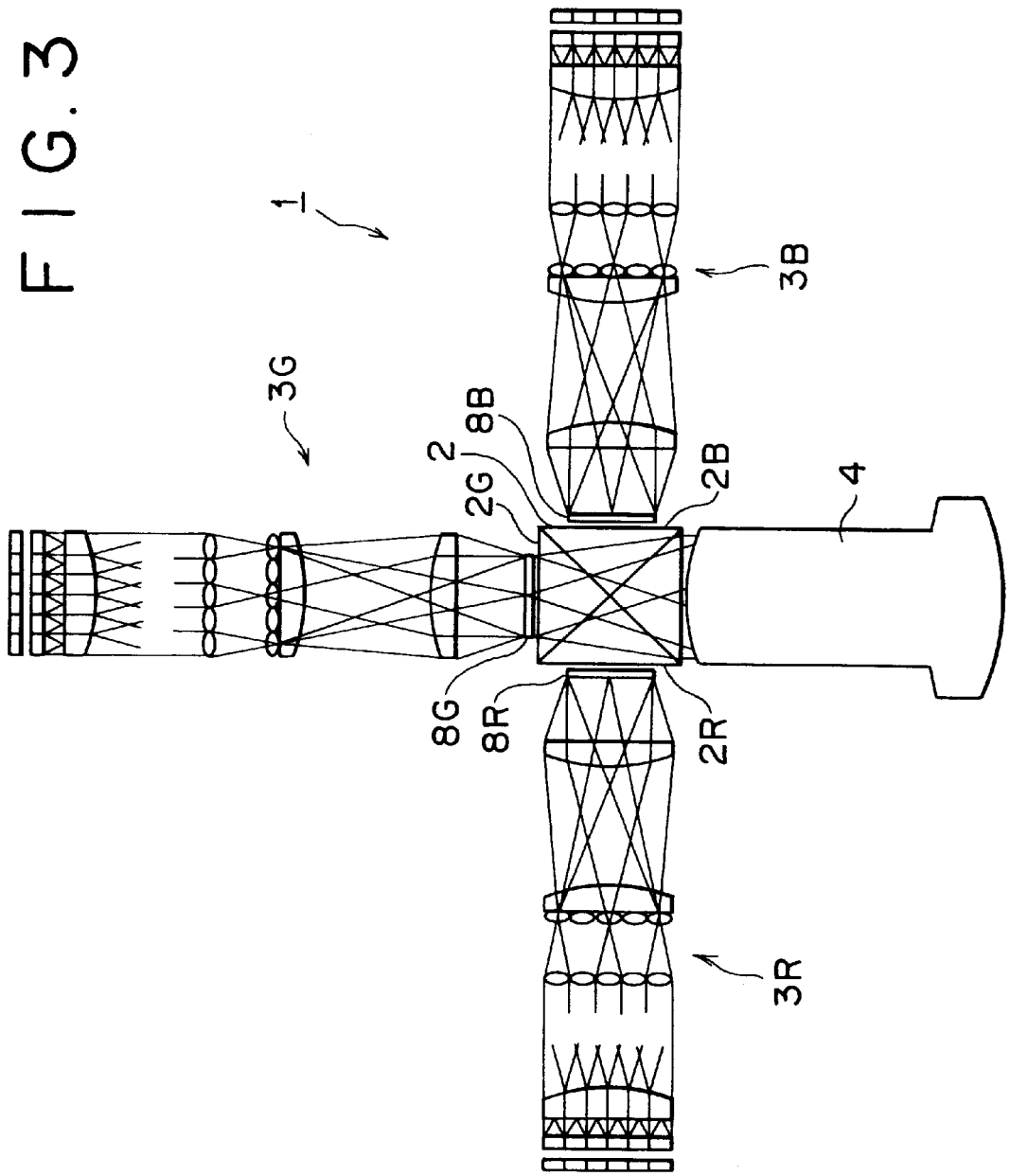
FIG. 3 is a schematic view showing an example of configuration of a video display apparatus to which the present invention is applied.

Referring to FIG. 3, there is shown a video display apparatus to which the present invention is applied. The video display apparatus shown is generally denoted at 1 and includes a dichroic prism 2 of a cubic shape, a green illuminating optical system 3G disposed in an opposing relationship to a surface 2G of the dichroic prism 2, a red illuminating optical system 3R disposed in an opposing relationship to a surface 2R of the dichroic prism 2 perpendicular to the surface 2G, and a blue illuminating optical system 3B disposed in an opposing relationship to a surface 2B of the dichroic prism 2 parallel to the surface 2R.

The video display apparatus 1 further includes a projector lens 4 disposed in an opposing relationship to the remaining surface of the dichroic prism 2 parallel to the surface 2G. The projector lens 4 has a function of projecting, when light synthesized by the dichroic prism 2 from light emitted from the illuminating optical systems 3G, 3R and 3B is inputted, the light as a video such as a still picture or a moving picture on a screen of the transmission type or the reflection type not shown. It is to be noted that the projector lens 4 may have a configuration similar to that of video display apparatus conventionally used widely, and therefore, detailed description of the projector lens 4 is omitted in the following description.

The video display apparatus 1 has such a configuration as described above. In the video display apparatus 1, red light, green light and blue light are emitted from the red illuminating optical system 3R, green illuminating optical system 3G and blue illuminating optical system 3B, respectively, and introduced independently of each other into the dichroic prism 2. The rays of light of the three colors are synthesized by the dichroic prism 2 and then introduced into the projector lens 4. In the video display apparatus 1, since the rays of light of the different colors are emitted from the illuminating optical systems independent of each other in this manner, the color reproducibility or the brightness of each color can be adjusted with a high degree of accuracy.

In the following, the red illuminating optical system 3R, green illuminating optical system 3G and blue illuminating optical system 3B described above are described more in detail. It is to be noted that, since the red illuminating optical system 3R, green illuminating optical system 3G and blue illuminating optical system 3B may have a substantially similar configuration, description is given below of an illuminating optical system 3 which represents the red illuminating optical system 3R, green illuminating optical system 3G and blue illuminating optical system 3B.

Figure 4:
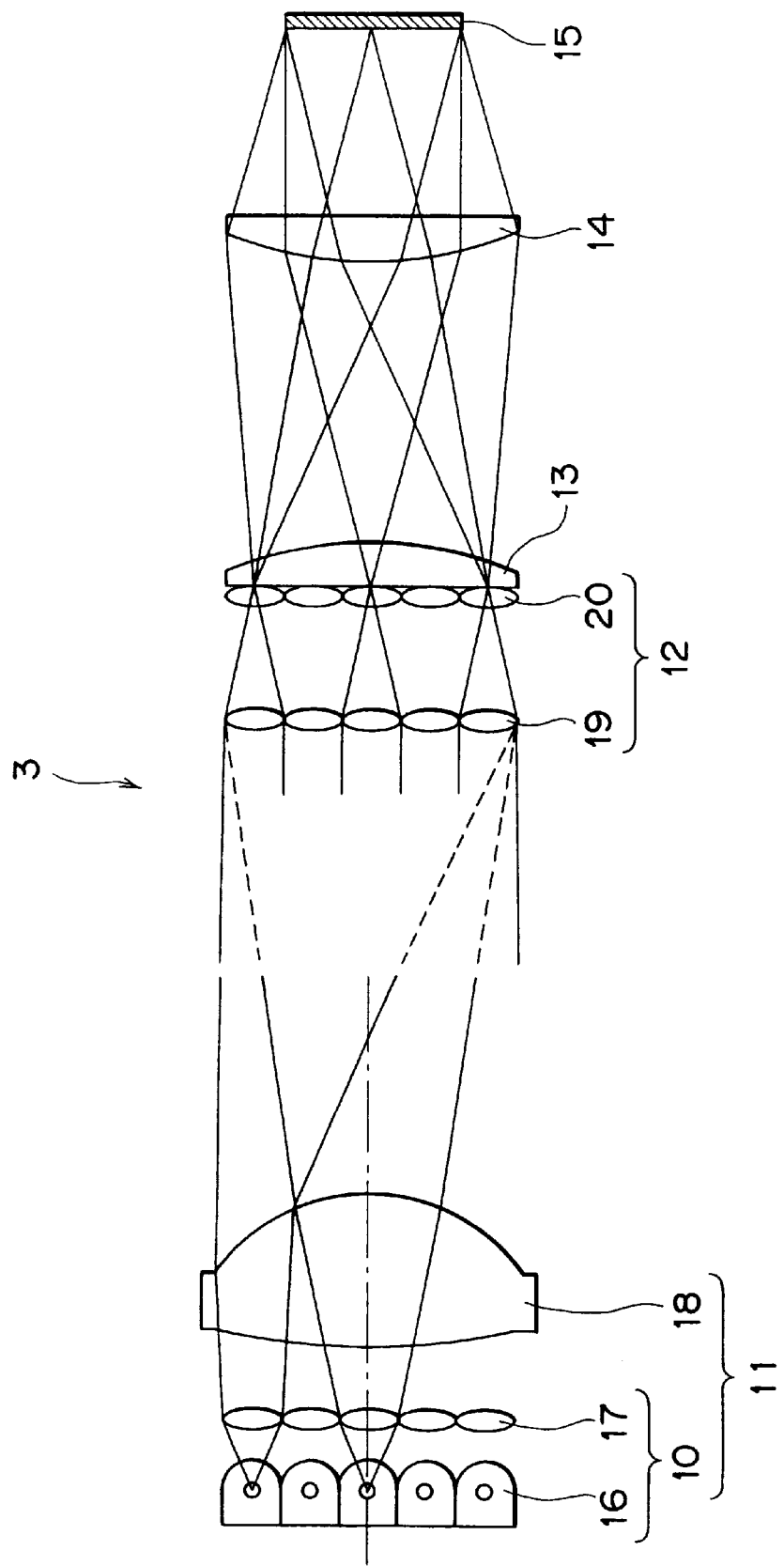
FIG. 4 is a schematic view showing an example of configuration of an illuminating optical system disposed in the video display apparatus of FIG. 3.

Referring to FIG. 4, the illuminating optical system 3 includes a light source unit 11 including a plurality of light source sections 10 and operable to condense light from the light source sections 10 at a predetermined position on an optical axis of the entire illuminating system, an integrator 12 disposed at a focus position of the light source unit 11, a first condenser lens 13, a second condenser lens 14, and a light valve 15. The illuminating optical system 3 is disposed such that the light valve 15 thereof may be opposed to the dichroic prism 2 of the video display apparatus 1.

Each of the light source sections 10 includes a light emitting diode 16 serving as a light source, and a coupling lens 17 for converting light emitted from the light emitting diode 16 into substantially parallel light. In the light source unit 11, the light source sections 10 each formed from a light emitting diode 16 and a coupling lens 17 are disposed on a plane. The light source unit 11 further includes a condenser lens 18 for condensing light from the light source sections 10 at the predetermined position on the optical axis of the entire illuminating optical system.

The integrator 12 is disposed at a focus position of the condenser lens 18 of the light source unit 11 and has a function of uniformizing the intra-plane optical intensity distribution of light emitted from the light source unit 11. The integrator 12 is composed of a first fly-eye lens 19 and a second fly-eye lens 20. The first fly-eye lens 19 and the second fly-eye lens 20 are disposed at positions conjugate with each other and form a telecentric optical system.

The first condenser lens 13 and the second condenser lens 14 have a function of condensing and introducing light having passed through the integrator 12 to the light valve 15.

In the illuminating optical system 3, light emitted from the light emitting diodes 16 is converted into substantially parallel light by the coupling lens 17. Since the light emitting diodes 16 form a surface illuminant, non-axial light from the outside of the optical axis is present. The light having passed through the coupling lenses 17 is refracted by the condenser lens 18 and is introduced into the integrator 12. The integrator 12 uniforms the distribution of the angle of the non-axial light with respect to the optical axis to uniformize the intra-plane optical intensity distribution. The light having passed through the integrator 12 is introduced into the first condenser lens 13.

In the illuminating optical system 3, the first condenser lens 13 and the second condenser lens 14 are disposed at positions conjugate with each other and thus form a telecentric optical system as described above. Then, the light having passed through and been converged by the first condenser lens 13 and the second condenser lens 14 is introduced into the light valve 15.

The illuminating optical system 3 is configured in such a manner as described above, and the red illuminating optical system 3R, green illuminating optical system 3G and blue illuminating optical system 3B have a configuration substantially similar to the illuminating optical system 3. However, the red illuminating optical system 3R, green illuminating optical system 3G and blue illuminating optical system 3B are configured such that light beams of the colors of red, green and blue are introduced therefrom to the dichroic prism 2, respectively. More particularly, for example, the light emitting diodes 16 serving as the light sources emit light of the colors of red, green and blue. Alternatively, for example, the illuminating optical system 3 may include various filters so that light emitted from the light emitting diodes 16 may be converted in wavelength into light of red, green and blue using the filters.

Each of the red illuminating optical system 3R, green illuminating optical system 3G and blue illuminating optical system 3B of the video display apparatus 1 includes a light valve 15. The light beam of red, green or blue irradiated upon the light valve 15 in each illuminating optical system 3 is spatially modulated by the light valve 15 and then inputted to the dichroic prism 2. The light beams of red, green and blue inputted to the dichroic prism 2 are synthesized by the dichroic prism 2 and then projected onto the screen through the projector lens 4.

With the video display apparatus 1 having the configuration described above, since light emitted from the light source sections 10 is condensed and inputted to the light valve 15, the number of light source sections 10 can be increased to increase the light amount readily if necessary. Further, since the light from the light source sections 10 is condensed at a predetermined focus position on the optical axis of the entire illuminating system and the integrator 12 is disposed at the focus position, the light can be irradiated uniformly upon the light valve 15, and the light emitted from the light source sections 10 can be inputted efficiently to the light valve 15.

It is to be noted that, for the light source for the light source sections 10 in the video display apparatus 1 described above, various semiconductor light emitting elements such as a laser diode or a white light lamp such as an electric discharge lamp like a metal halide lamp or a halogen lamp may be used instead of the light emitting diode 16. Where a white light lamp is used for the light source, various filters may be used to convert the white light in wavelength into light beams of red, green and blue, which are irradiated upon the dichroic prism 2.

Where the light emitting diodes 16 are used to emit light beams of red, green and blue directly without using various filters, for the semiconductor light emitting element for red, a compound semiconductor of the GaP type, the GaAs type or the AlAs type like GaAlAs, GaAsP or AlGaPAs for example, can be used. For the semiconductor light emitting element for green, a compound semiconductor of the GaN type or the ZnSe type like InGaN or AlInGaN for example, can be used. Further, for the semiconductor light emitting element for blue, a compound semiconductor of the GaN type, the ZnSe type or the SiC type such as InGaN or AlInGaN for example, can be used.

Figure 5:
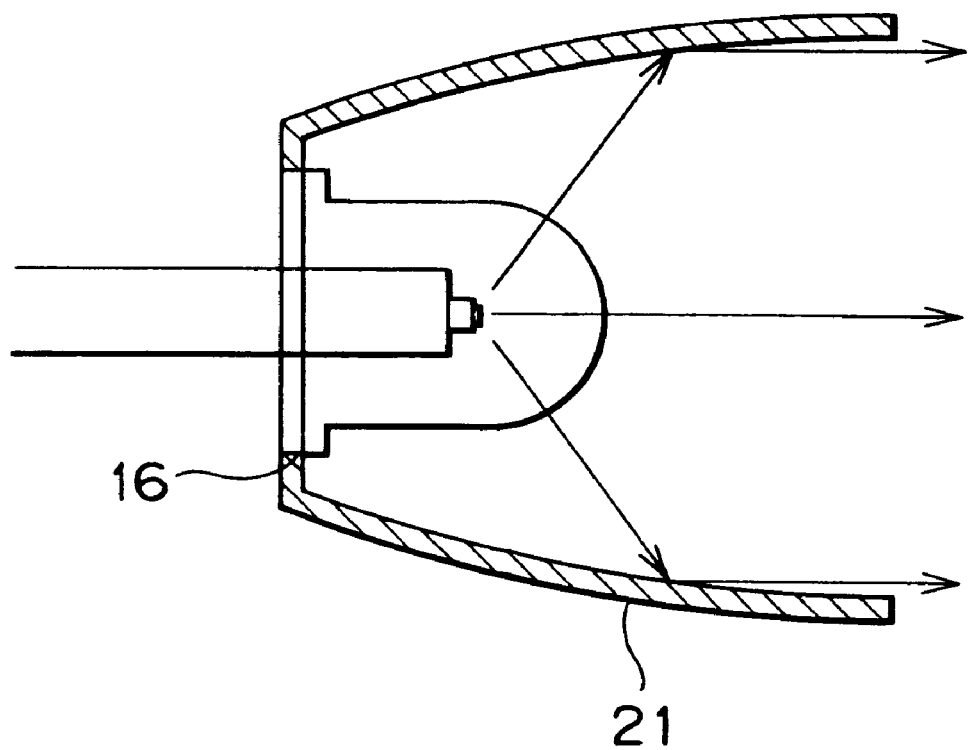
FIG. 5 is a schematic view showing an example of configuration of a light emitting diode disposed in the video display apparatus of FIG. 3.

Further, in the video display apparatus 1 according to the present invention, a light emitting diode 16 serving as a light source of the light source sections 10 may include a reflecting mirror (reflector) 21 for reflecting light to be emitted in one direction as seen in FIG. 5. The provision of the reflecting mirror 21 augments the utilization efficiency of light emitted from the light emitting diode 16 and makes it possible to display a bright video with a low output power. It is to be noted that, where a sufficient light condensing property can be obtained by the provision of the reflecting mirror 21 for the light source in this manner, the light source sections 10 may not include the coupling lenses 17.

Furthermore, in the video display apparatus 1 described above, various coupling optical elements having a function of condensing light emitted from a light source may be used in place of the coupling lenses 17. Further, while the video display apparatus 1 uses a condenser lens to refract light, a similar effect can be anticipated even where each of the condenser lenses is replaced by a Fresnel lens having a diffraction action.

In the following, preferable geometrical relationships relating to locations of the light emitting diodes 16 and individual lenses in the video display apparatus 1 described above are described.

Figure 6:
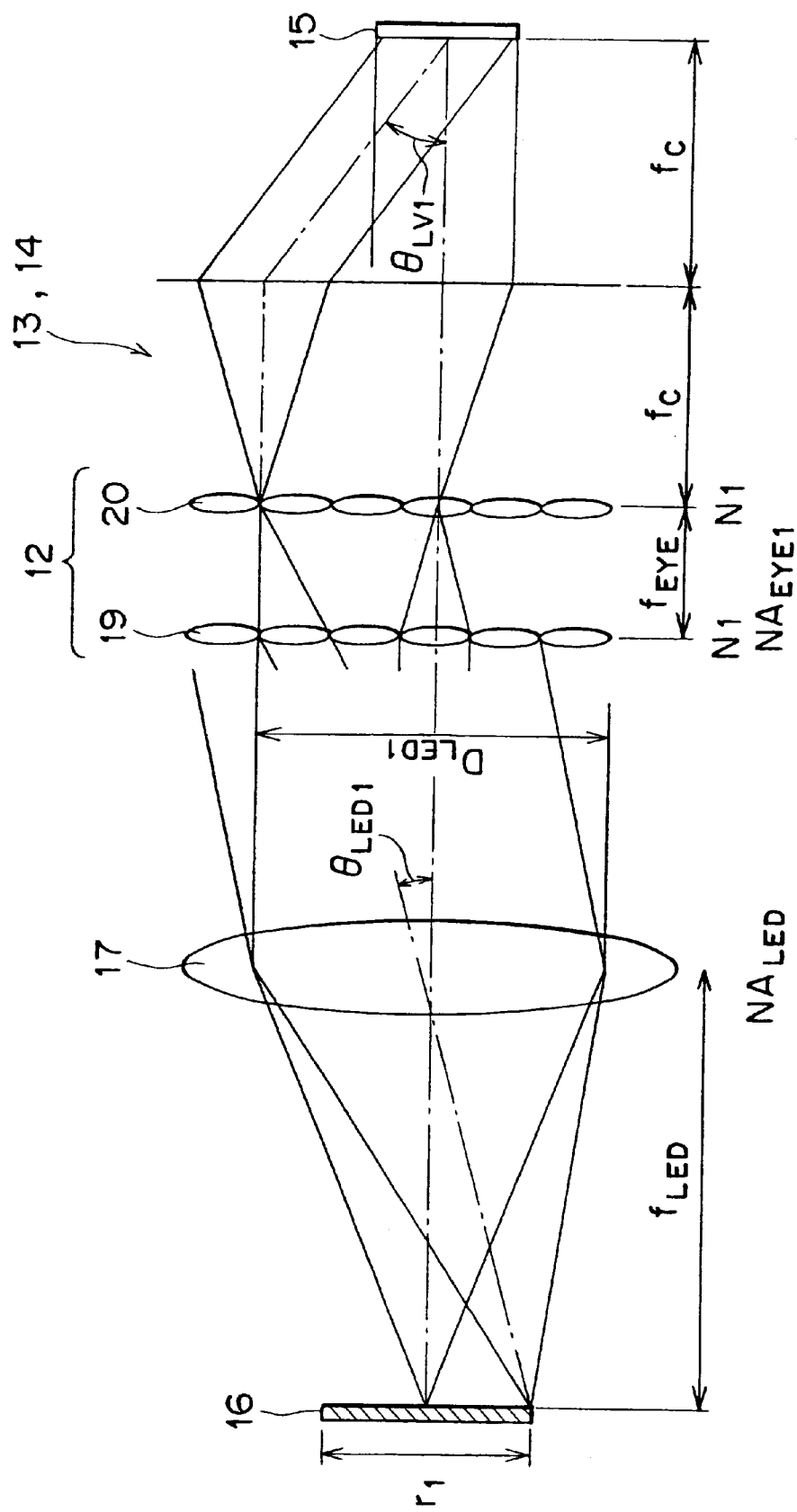
FIG. 6 is a diagrammatic view illustrating a geometrical relationship of an optical system of the video display apparatus of FIG. 3.

First, a geometrical relationship between the light emitting diodes 16 and individual lenses suitable to uniformize light emitted from the light emitting diodes 16 and achieve the high irradiation efficiency upon the light valve 15 is described with reference to FIG. 6. Here, description is given of a minor side direction of the light valve 15. The subscript "1" used in the following description indicates a minor side direction of the light valve 15 while the subscript "2" indicates a major side direction of the light valve 15.

Where the length of the light emitting diodes 16 is represented by $r_1$, the effective focal length of the coupling lens 17 by $f_{LED}$, and the effective numerical aperture of the coupling lens 17 by $NA_{LED}$, the optical coupling efficiency $\eta_{LED}$ of the light emitting diodes 16 is represented by the following expression 1:

$$\eta_{LED} = NA_{LED2} \quad \text{(Expression 1)}$$

The maximum value $\theta_{LED1}$ of the angle of non-axial light with respect to the optical axis is represented by the following expression 2:

$$\theta_{LED1} = r_1/(2f_{LED}) \quad \text{(Expression 2)}$$

The exit pupil diameter $D_{LED1}$ of light having passed through the coupling lens 17 is given by the following expression 3:

$$D_{LED1} = 2NA_{LED} \times f_{LED} \quad \text{(Expression 3)}$$

From the expressions 2 and 3 given above, the following expression 4 can be obtained:

$$D_{LED1} = NA_{LED} \times r_1/\theta_{LED1} \quad \text{(Expression 4)}$$

Further, where the number of element lenses of the first and second fly-eye lenses 19 and 20 is represented by N1, the effective focal length of the first and second fly-eye lenses 19 and 20 by $f_{EYE}$, and the effective numerical aperture of the first and second fly-eye lenses 19 and 20 by $NA_{EYE1}$, the exit pupil diameter $D_{LED1}$ is represented by the following expression 5:

$$D_{LED1} = 2N1 \times f_{EYE} \times NA_{EYE1} \quad \text{(Expression 5)}$$

Meanwhile, where the effective focal length of the first and second condenser lenses 13 and 14 is represented by $f_c$ and the maximum value of the angle of light irradiated upon the light valve 15 with respect to the optical axis by $\theta_{LV1}$, the exit pupil diameter $D_{LED1}$ is represented by the following expression 6:

$$D_{LED1} = 2f_c \times \theta_{LV1} \quad \text{(Expression 6)}$$

Where the length of the light valve 15 is represented by $L_{LV1}$, it is given by the following expression 7:

$$2f_c \times NA_{EYE1} = L_{LV1} \quad \text{(Expression 7)}$$

Here, from the expressions 6 and 7 given above, the following expression 8 can be obtained:

$$NA_{EYE1} = L_{LV1} \times \theta_{LV1}/D_{LED1} \quad \text{(Expression 8)}$$

Further, from the expressions 4 and 8 given above, the following expression 9 can be obtained:

$$NA_{EYE1} = \theta_{LED1} \times L_{LV1} \times \theta_{LV1}/(NA_{LED} \times r_1) \quad \text{(Expression 9)}$$

Furthermore, from the expression 9 above, the following expression 10 can be obtained:

$$\theta_{LED1}/NA_{EYE1} = r_1/L_{LV1} \times NA_{LED}/\theta_{LV1} \quad \text{(Expression 10)}$$

Figure 7:
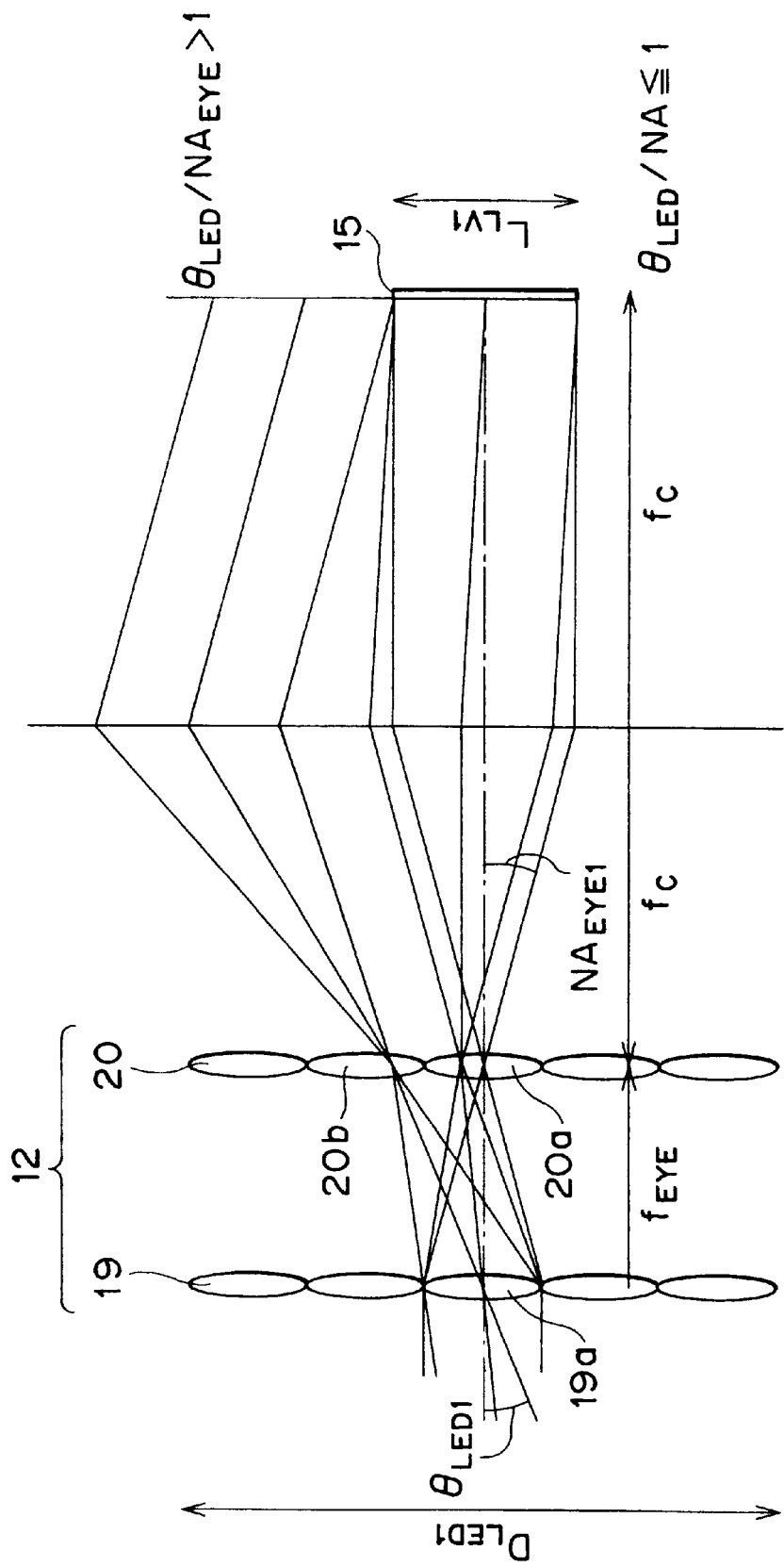
FIG. 7 is a diagrammatic view illustrating an illuminating condition of the video display apparatus of FIG. 3 upon a light valve.

Here, when an irradiation condition upon the light valve 15 is examined, the second fly-eye lens 20 is significant. As seen in FIG. 7, light which has passed through an element lens 19a of the first fly-eye lens 19 and then enters a corresponding element lens 20a of the second fly-eye lens 20 is irradiated upon the light valve 15. However, light which has passed through the element lens 19a of the first fly-eye lens 19 but enters an adjacent element lens 20b of the second fly-eye lens 20 is not irradiated upon the light valve 15.

Figure 8:
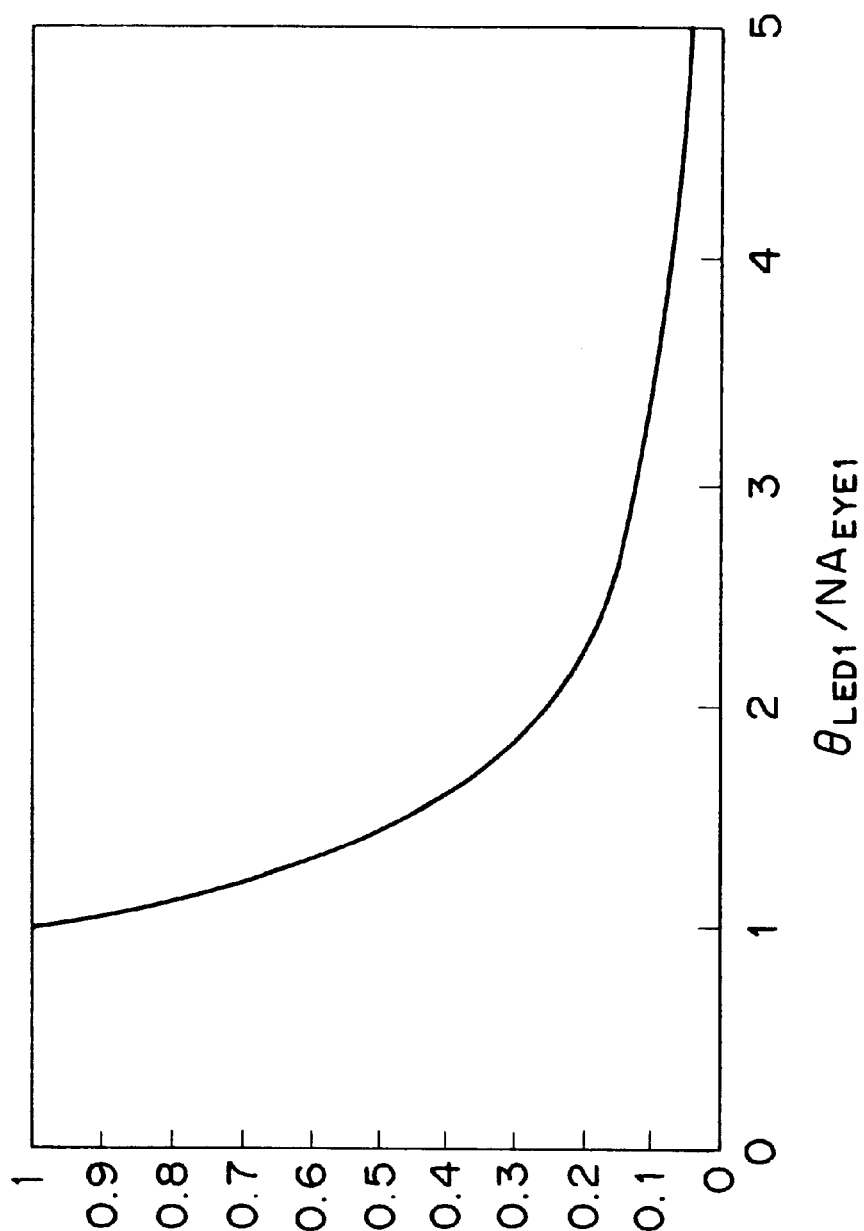
FIG. 8 is a diagram illustrating a relationship between a $\theta_{LED1}/NA_{EYE1}$ and irradiation efficiency of light upon a light valve in the video display apparatus of FIG. 2.

A relationship between the ratio between the inclination $\theta_{LED1}$ of non-axial light and the effective numerical aperture $NA_{EYE1}$ of the first and second fly-eye lenses 19 and 20 and the irradiation efficiency upon the light valve 15 is illustrated in FIG. 8.

Accordingly, the irradiation condition upon the light valve 15 is given by the following expression 11:

$$\theta_{LED1}/NA_{EYE1} \leq 1 \quad \text{(Expression 11)}$$

When $\theta_{LED1}/NA_{EYE1} \leq 1$, all light emitted from the light emitting diodes 16 is irradiated upon the light valve 15, but when $\theta_{LED1}/NA_{EYE1} > 1$, part of light emitted from the light emitting diodes 16 is irradiated outside the light valve 15, and this deteriorates the light irradiation efficiency.

Here, from the expressions 10 and 11 given above, the following expression 12 can be obtained:

$$r_1 \leq L_{LV1} \times \theta_{LV1}/NA_{LED} \quad \text{(Expression 12)}$$

The expression 12 obtained in such a manner as described above resolves itself into the Lagrange-Helmholtz equation which indicates a relationship between the magnitude of an object and the magnitude of an image.

It is to be noted that, while the foregoing description relates to the minor side direction of the light valve 15, the relationship given above similarly applies to the major side direction of the light valve 15. Accordingly, in order to assure high light irradiation efficiency upon the light valve 15, the following expression 13 is preferably satisfied also with regard to the major side direction:

$$r_2 \leq L_{LV2} \times \theta_{LV2}/NA_{LED} \quad \text{(Expression 13)}$$

From the foregoing description, in order to allow light emitted from the light emitting diodes 16 to be irradiated upon the light valve 15 efficiently, the total area S of the light emitting regions of the light emitting diodes 16 is preferably set smaller than $(L_{LV1} \times \theta_{LV1}/NA_{LED}) \times (L_{LV2} \times \theta_{LV2}/NA_{LED})$.

Generally, the maximum angles $\theta_{LV1}$ and $\theta_{LV2}$ of irradiation light upon the light valve 15 with respect to the optical axis are restricted, where the light valve 15 is, for example, of the transmission type, from the contrast of the liquid crystal, the angle of view of the projector lens and so forth similarly with regard to the minor and major side directions. Also where the light valve 15 is of the reflection type, the maximum angles $\theta_{LV1}$ and $\theta_{LV2}$ are restricted from the contrast of the incidence angle dependency of the polarizing prism and so forth similarly with regard to the minor and major side directions. Therefore, the maximum angles $\theta_{LV1}$ and $\theta_{LV2}$ in most cases exhibit a relationship of $\theta_{LV1} = \theta_{LV2}$. Further, since normally the effective numerical aperture $NA_{LED}$ is equal for both of the major and minor side directions of the light valve 15, the ratio of $r_1$ and $r_2$ is equal to the ratio of $L_{LV1}$ and $L_{LV2}$.

Accordingly, the light emitting region formed from a plurality of light emitting diodes 16 of the light source unit 11 preferably has a similar figure to that of the light valve 15. This allows light from the light emitting diodes 16 to be introduced into the light valve 15 without loss and thus can assure high utilization efficiency of light from the light emitting diodes 16.

It is to be noted that, in the video display apparatus 1, not only the light emitting region of the light source unit 11 but also the element lenses of the first and second fly-eye lenses 19 and 20 of the integrator 12 preferably have a similar figure to that of the light valve 15. This can assure higher utilization efficiency of light from the light emitting diodes 16.

Here, the length $L_{LV1}$ in the minor side direction and the length $L_{LV2}$ in the major side direction of the light valve 15 described above may be the lengths in the minor side direction and the major side direction, respectively, of a display portion on which a video is actually displayed, that is, a portion to be illuminated. However, since actually non-uniform illumination is likely to be caused by aberration, there is a possibility that a portion which is not illuminated with light may appear at a peripheral portion of the light valve 15. Further, where positioning upon manufacture, a margin to the magnitude of the region and so forth are taken into consideration, the irradiation region in which light is irradiated is preferably set a little greater than the display portion.

Therefore, in the video display apparatus 1, preferably the length of the display portion in the minor side direction is smaller than the length $L_{LV1}$ of the light valve 15 in the minor side direction and the length of the display portion in the major side direction is smaller than the length $L_{LV2}$ of the light valve 15 in the major side direction.

Where the irradiation region is set a little greater than the display portion, a video is not actually displayed at a peripheral portion upon which light may not possibly be irradiated, and high irradiation efficiency can be achieved over the entire area of the display portion. More particularly, taking an aberration, a margin upon manufacture and other factors into consideration, the length $L_{LV1}$ in the minor side direction and the length $L_{LV2}$ in the major side direction of the light valve 15 are preferably set greater than the lengths of the display portion in the minor side direction and the major side direction by approximately 5 to 10%. Alternatively, taking a margin for positioning into consideration, the length $L_{LV1}$ in the minor side direction and the length $L_{LV2}$ in the major side direction of the light valve 15 may be set equal to the outer profile of the device of the light valve 15 or set greater than the lengths of the outer profile in the minor side direction and the major side direction by approximately 5 to 10%.

The light emitting region of the light emitting diodes 16 has, for example, a substantially rectangular shape whose length in the minor side direction is $r_1$ and whose length in the major side direction is $r_2$. Further, the light emitting region of the light emitting diodes 16 preferably has a similar figure to that of the light valve 15. Where the light emitting region of the light emitting diodes 16 has a similar figure to that of the light valve 15, light is irradiated upon the light valve 15 without loss, and higher irradiation efficiency of light can be anticipated.

In the following, a geometrical relationship between the light source sections 10 of the light source unit 11 and the condenser lens 18 is described.

Figure 9A:
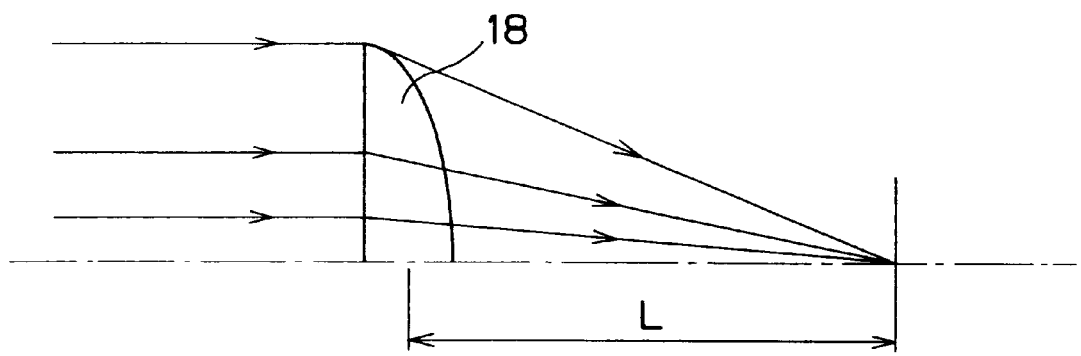
FIGS. 9A and 9B are diagrammatic views illustrating the focus position of a condenser lens disposed in a light source unit of the video display apparatus of FIG. 3 when light is inputted parallelly to an optical axis and when light is inputted obliquely to the optical axis, respectively.
Figure 9B:
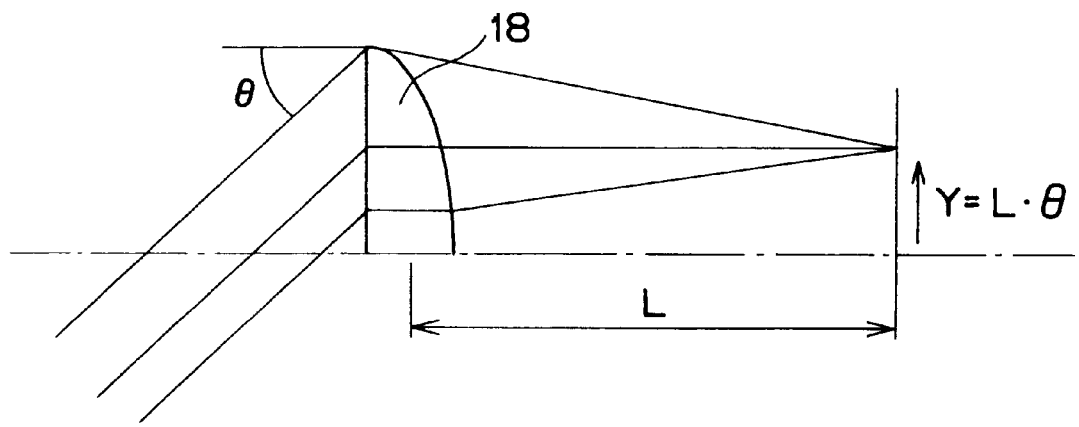

If the angles of rays of light which enter the condenser lens 18 of the light source unit 11 are equal, then images of them are formed at a substantially same position. More particularly, if rays of light parallel (at an angle of 0 degree with respect) to the optical axis as seen in FIG. 9A enter the condenser lens 18, then the incident rays of light form an image at the focus position spaced by the distance L from the condenser lens 18 on the optical axis. Also when rays of light enter the condenser lens 18 at an angle θ with respect to the optical axis as seen in FIG. 9B, the incident rays of light form an image at the position spaced by the distance Y in the vertical direction from the optical axis. The distance Y in this instance has a relationship of the product of the focal distance L and the angle θ of incidence.

Figure 9C:
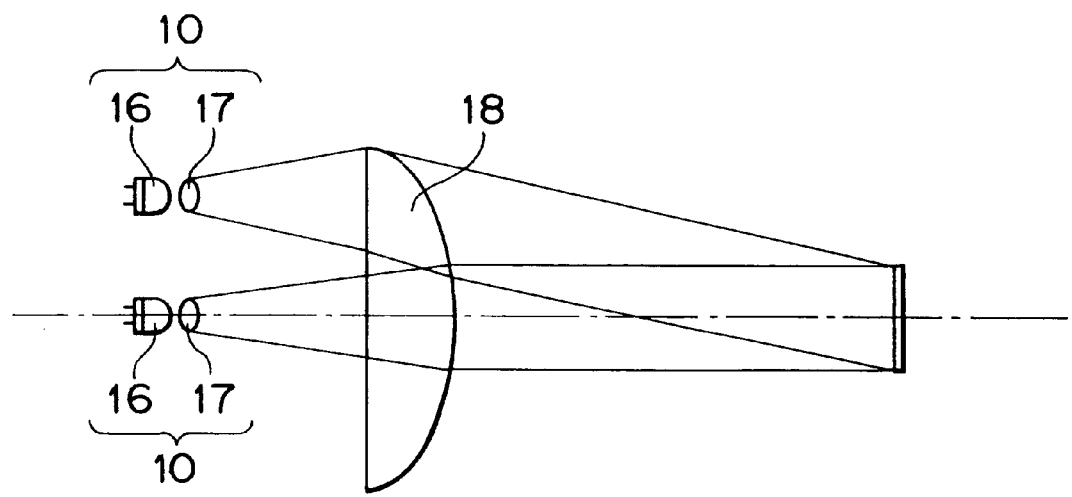
FIG. 9C is a diagrammatic view illustrating a positional relationship between a plurality of light source sections and a condenser lens.

Therefore, where the large number of light emitting diodes 16 are disposed on a plane on the incidence side of the condenser lens 18 as seen in FIG. 9C, even if rays of light from the light emitting diode 16 are inputted to different positions of the condenser lens 18, they form a single luminous flux at the focus position. Accordingly, in the video display apparatus 1, the plurality of light emitting diodes 16 and the corresponding coupling lens 17 are disposed in respective planes in the light source unit 11 and the integrator 12 is disposed at the focus position of the condenser lens 18 so that the description given hereinabove with reference to FIG. 6 may be satisfied.

Here, a case wherein the focal length of the condenser lens 18 is represented by L and the distance from the optical axis of the entire illuminating system to each light source section 10 is represented by H as seen in FIG. 10 is examined.

As seen in FIG. 10, rays of light from a light source section 10 at the position of the distance H from the optical axis are condensed by the condenser lens 18 and is inputted to the integrator 12 at a predetermined angle. In this instance, if the angle of incidence to the integrator 12 is excessively great, then, for example, the rays of light incident to the element lens 19a of the first fly-eye lens 19 cannot be introduced into the element lens 20a of the second fly-eye lens 20 which is paired with the element lens 19a. Consequently, the function of the integrator 12 drops and the amount of light irradiated upon the light valve 15 decreases.

In the integrator 12, the limit angle of incident light with which light incident to the element lens 19a of the first fly-eye lens 19 is introduced into the element lens 20b next to the element lens 20a of the second fly-eye lens 20 which is paired with the element lens 19a is approximately 15°. Accordingly, the video display apparatus 1 preferably satisfies the following expression 14:

$$|H/L| < 0.27 \qquad \text{(Expression 14)}$$

In other words, preferably the value of the angle range $|H/L|$ of rays of light incident to the video display apparatus 1 is smaller than tan 15°, that is, smaller than 0.27. This eliminates an otherwise possible drop of the amount of light irradiated upon the light valve 15 and can augment the utilization efficiency of light from the light emitting diodes 16.

By the way, in the foregoing description, the condenser lens 18 is provided in the light source unit 11, and a plurality of light source sections 10 are disposed on a plane. However, the present invention is not limited to the specific form. For example, the illuminating optical system 3 may be configured otherwise such that, as shown in FIG. 11, the light source unit 11 does not include the condenser lens 18, but a plurality of light source sections 10 are disposed on a semi-sphere centered at the focus position of the light source unit 11 while the integrator 12 is disposed at the focus position such that light from the light source sections 10 may be introduced into the integrator 12.

In this instance, where the radius of the semi-sphere on which the light source sections 10 are disposed, that is, the distance from each light source section 10 to the focus position, is represented by L and the distance from each light source section 10 to the focus position is represented by H as shown in FIG. 12, preferably the expression 14 given hereinabove is satisfied similarly as in the foregoing description given hereinabove with reference to FIG. 10.

Further, in the foregoing description, the video display apparatus 1 includes a light valve 15 in each of the illuminating optical systems 3 of the red illuminating optical system 3R, green illuminating optical system 3G and blue illuminating optical system 3B. However, the present invention is not limited to the specific form. For example, light synthesized in color by the dichroic prism 2 may be inputted to the light valve 15 in the form of a single plate.

Figure 13:
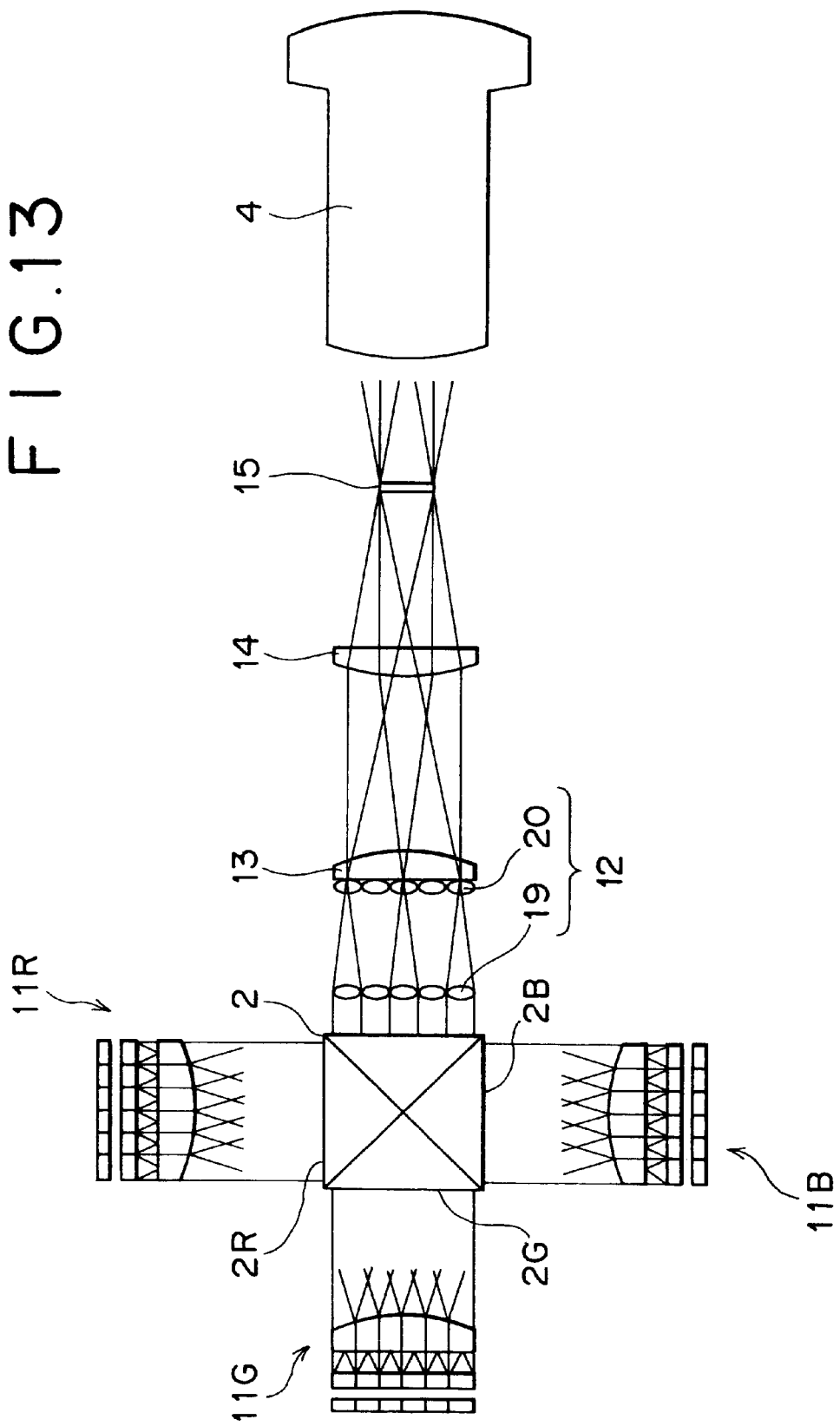
FIG. 13 is a schematic view showing an example of configuration of another video display apparatus to which the present invention is applied.

In this instance, the first condenser lens 13 includes, as shown in FIG. 13, a dichroic prism 2 of a cubic shape, a green light source unit 11G disposed in an opposing relationship to a surface 2G of the dichroic prism 2, a red light source unit 11R disposed in an opposing relationship to another surface 2R of the dichroic prism 2 perpendicular to the surface 2G, and a blue light source unit 11B disposed in an opposing relationship to a further surface 2B of the dichroic prism 2 parallel to the surface 2R. Here, the red light source unit 11R, green light source unit 11G and blue light source unit 11B correspond to the light source unit 11 described above, and introduce light beams of red, green and blue into the dichroic prism 2, respectively.

The video display apparatus 1 further includes an integrator 12 disposed in an opposing relationship to a still further surface of the dichroic prism 2 parallel to the surface 2G, first and second condenser lenses 13 and 14, a light valve 15, and a projector lens 4.

In the video display apparatus 1 shown in FIG. 13, beams of light of red, green and blue emitted from the light source units 11R, 11G and 11B are introduced into the dichroic prism 2. The beams of light of red, green and blue inputted to the dichroic prism 2 are synthesized in color by the dichroic prism 2. The color synthesized light passes through the integrator 12 and the first and second condenser lenses 13 and 14 and is irradiated upon the light valve 15. The light irradiated upon the light valve 15 is spatially modulated by the light valve 15. The spatially modulated light passes through the light valve 15 and is projected on a screen through the projector lens 4.

Also where the video display apparatus 1 has such a configuration as described above, since light emitted from each light source section 10 is condensed and introduced into the corresponding light valve 15, when necessary, the number of light source sections 10 can be increased to increase the light amount readily. Further, since light from the light source sections 10 is condensed at a predetermined focus position on the optical axis of the entire illuminating system and the integrator 12 is disposed at the focus position, light can be irradiated uniformly upon the light valve 15 and light emitted from the light source sections 10 can be introduced efficiently into the light valve 15.

The present invention can be applied also to a video display apparatus which involves polarization conversion.

Figure 14:
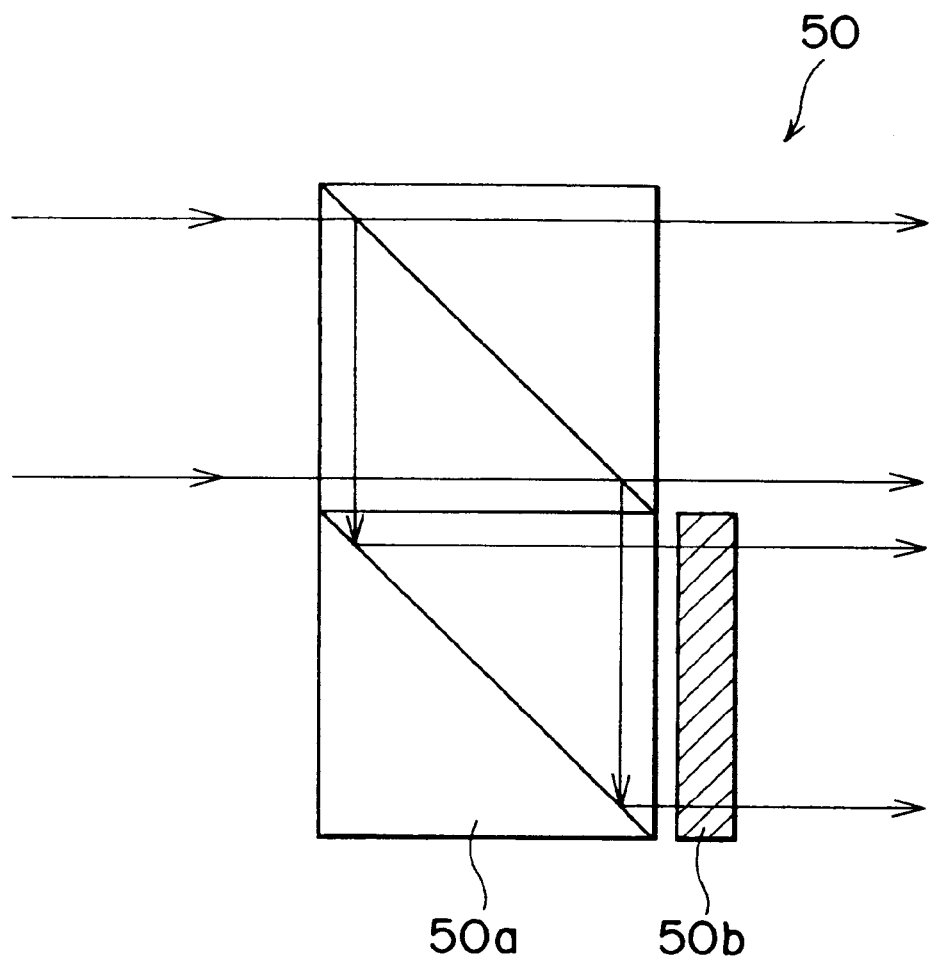
FIG. 14 is a schematic view showing an example of configuration of a polarization conversion element which may be provided in a video display apparatus according to the present invention[.]
Figure 15:
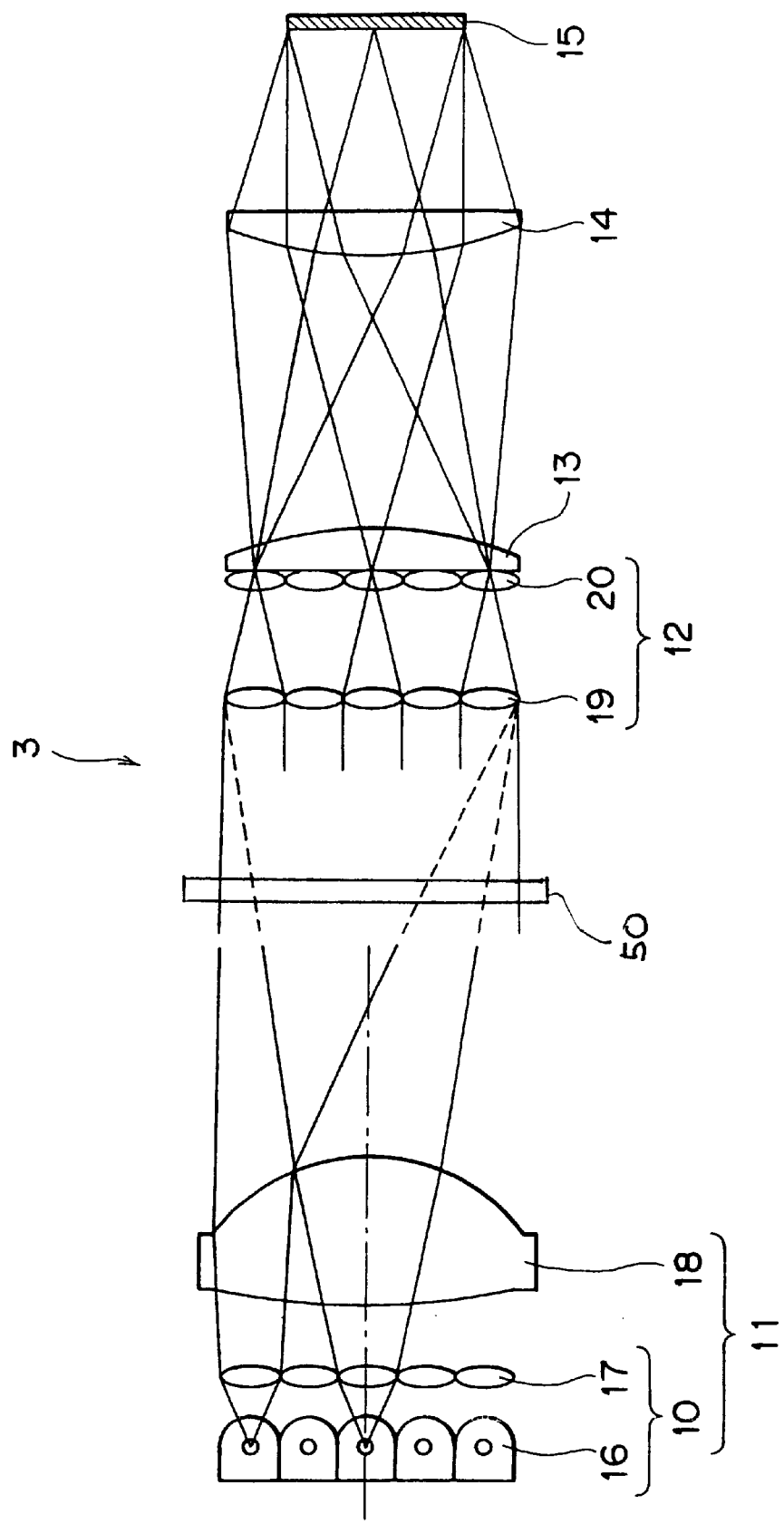
FIG. 15 is a schematic view showing a configuration of the illuminating optical system of FIG. 4 with a polarization conversion element located between the light source unit and the integrator.
Figure 16:
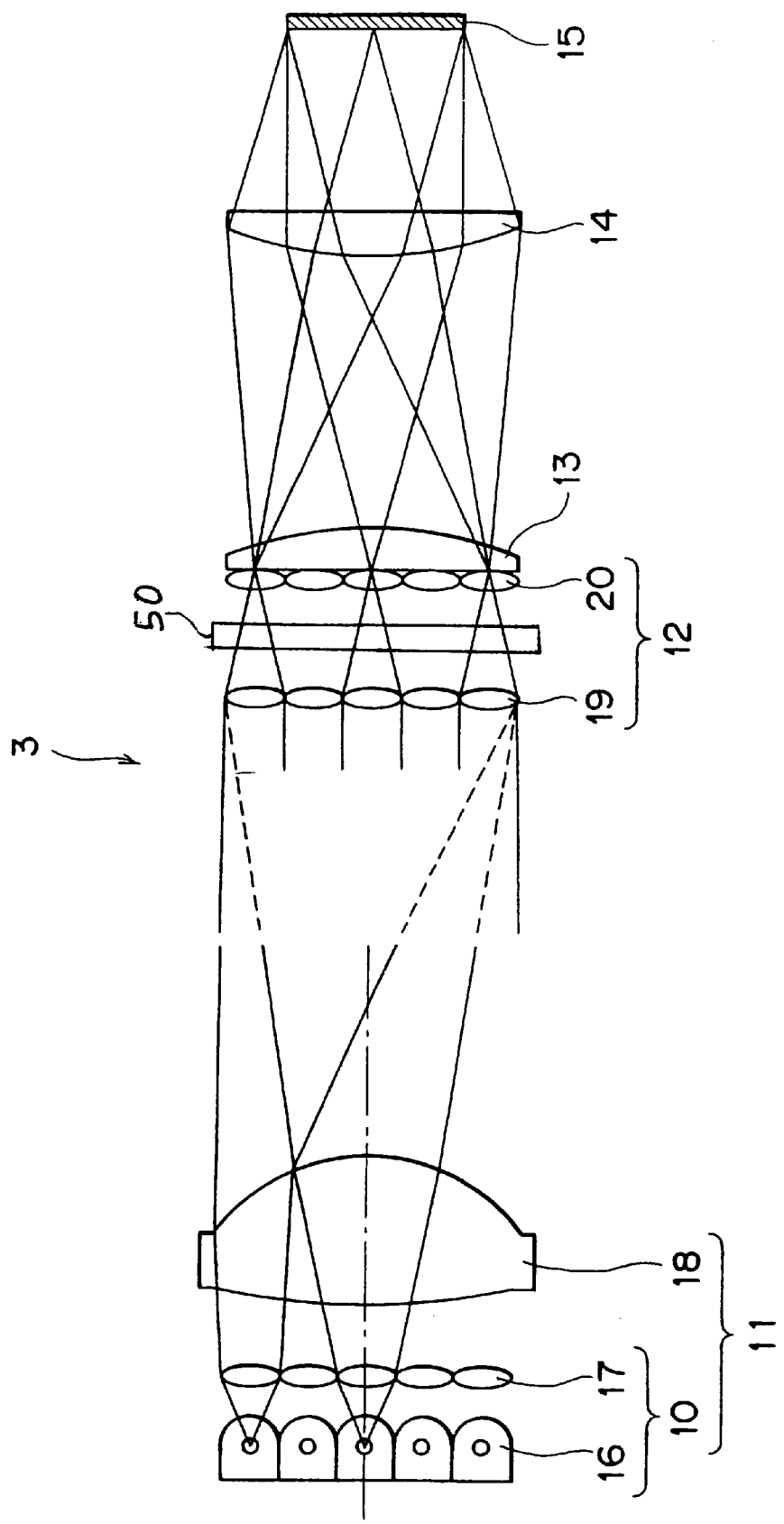
FIG. 16 is a schematic view showing a configuration of the illuminating optical system of FIG. 4 with a polarization conversion element located between a first fly-eye lens and a second fly-eye lens.
Figure 17:
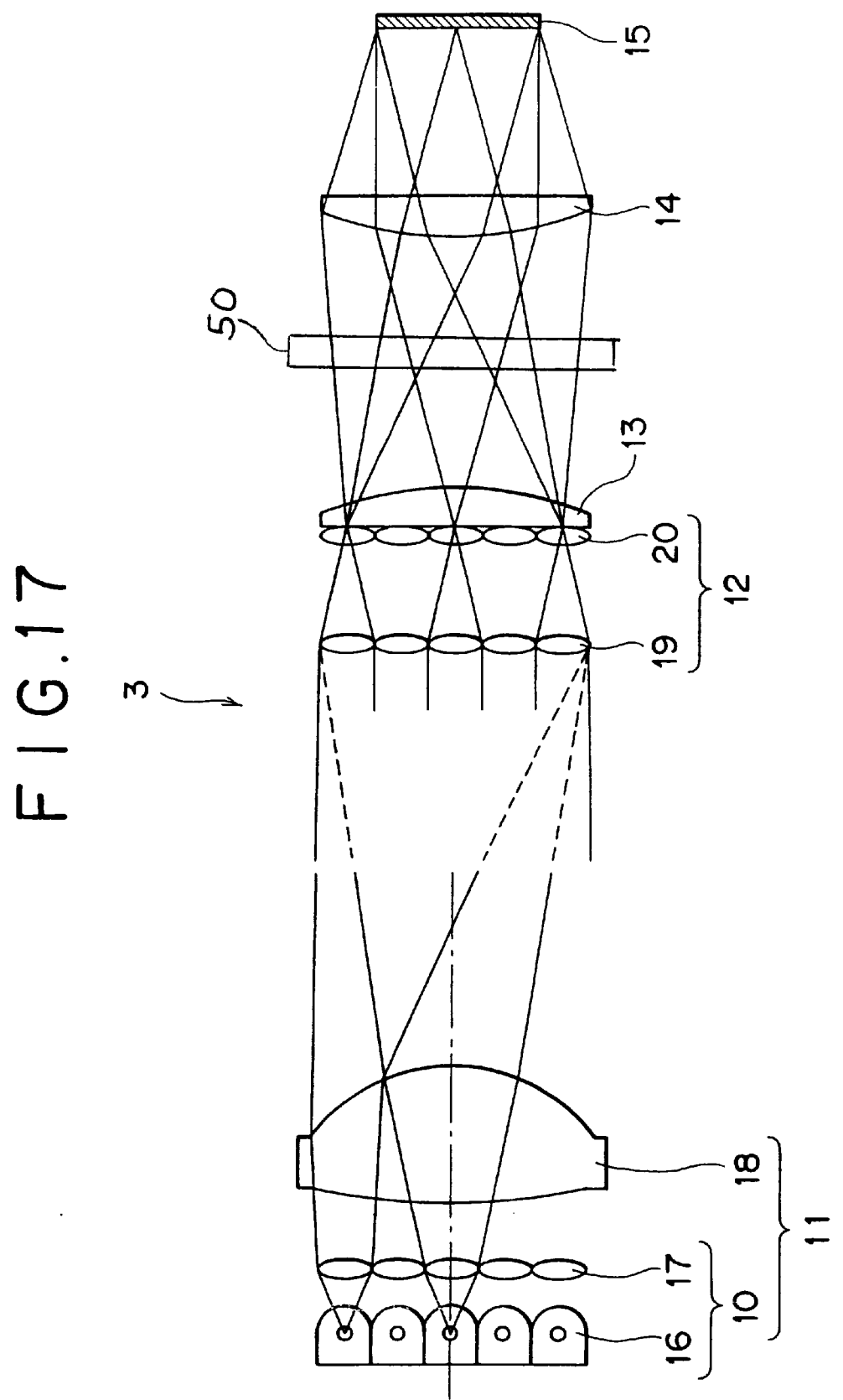
FIG. 17 is a schematic view showing a configuration of the illuminating optical system of FIG. 4 with a polarization conversion element located between the integrator and the light valve.

The video display apparatus which involves polarization conversion in this manner can be obtained, for example, by providing the video display apparatus 1 described above with, for example, such a polarization conversion element 50 as shown in FIG. 14 at least at one of a position between the light source unit 11 and the integrator 12 shown in FIG. 15, another position between the first fly-eye lens 19 and the second fly-eye lens 20 of the integrator 12 shown at FIG. 16, and a further position between the integrator 12 and the light valve 15 shown at FIG. 17.

Referring to FIG. 14, the polarization conversion element 50 may be formed, for example, from a polarizing beam splitter 50a and a half-wave polarizing plate 50b. Light introduced into the polarization conversion element 50 first enters the polarizing beam splitter 50a. Of the light introduced into the polarizing beam splitter 50a, S polarized light whose polarization direction is perpendicular to the incidence plane is reflected by a reflecting surface of the polarizing beam splitter 50a and introduced into the half-wave polarizing plate 50b. The half-wave polarizing plate 50b rotates the polarization plane of the light entering the half-wave polarizing plate 50b. On the other hand, of the light introduced into the polarizing beam splitter 50a, P polarized light whose polarization direction is parallel to the incidence plane passes through the polarizing beam splitter 50a and advances straightforwardly.

Since the video display apparatus 1 includes such a polarization conversion element 50 as described above, each light beam is split into two beams by polarization conversion, and therefore, apparently a doubled number of light emitting diodes 16 are used. Therefore, where such polarization conversion is used as described above, preferably the total area of the light emitting regions of the light emitting diode 16 of the light source unit 11 is smaller set than ½ of $(L_{LV1} \times \theta_{LV1}/NA_{LED}) \times (L_{LV2} \times \theta_{LV2}/NA_{LED})$.

In the video display apparatus 1, since the total area of the light emitting regions of the light source unit 11 can be reduced to one half by polarization conversion, not only miniaturization of the apparatus can be anticipated, but also an equal brightness can be obtained with one half power. Consequently, the apparatus can be formed for reduced power consumption.

Further, while, in the foregoing description, the light valve 15 is presumed to be a light valve of the transmission type, the present invention is not limited to the specific configuration, and a light valve of the reflection type may be used alternatively.

As a light valve of the transmission type, for example, an STN (Super Twisted Nematic) liquid crystal display element, a ferroelectric liquid crystal display element, or a liquid crystal display element of the high molecular dispersion type may be used. Also an element wherein liquid crystal is driven in a simple matrix or in an active matrix may be used.

Meanwhile, as a light valve of the reflection type, for example, a liquid crystal display element of the reflection type wherein liquid crystal of the TN (Twisted Nematic) mode, ferroelectric liquid crystal, liquid crystal of the high molecular dispersion type or the like is driven from driving electrodes or a driving active element provided on a glass substrate or a silicon substrate. Also a liquid crystal display element wherein light is irradiated through a photoconductive film to apply a voltage to liquid crystal may be used. Furthermore, a display element of the reflection type such as a grating light valve which includes a structure whose shape or state changes in response to an electric field applied thereto may be used alternatively.

While preferred embodiments of the present invention have been described using specific terms, such description is for illustrative purposes only, and it is to be understood that changes and variations may be made without departing from the spirit or scope of the following claims.

What is claimed is:

1. A video display apparatus comprising:
a light source unit having a plurality of light source sections each having a light source formed from one of a semiconductor light emitting element and a white light lamp and a coupling optical element for converting light emitted from said light source into substantially parallel light, said light source unit including a condenser lens being operable to condense said light from said light source sections having passed through each said coupling optical element at a predetermined focus position on an optical axis of illuminating said video display apparatus, wherein said light source sections are disposed on a plane in said light source unit such that said light from said light source sections is condensed at said predetermined focus position of said condenser lens;
an integrator disposed at the predetermined focus position of said light source unit for equalizing an intra-plane light intensity distribution of said light emitted from said light source unit; and
a light valve of a substantially rectangular shape upon which said light whose intra-plane light intensity distribution has been equalized by said integrator is irradiated, and said light source unit further includes a condenser lens, and said light source sections are disposed on a plane in said light source unit such that said light from said light source sections is condensed at said predetermined focus position by said condenser lens, and
wherein a focal distance of said condenser lens is represented by L, a maximum distance from said optical axis of said video display apparatus to an optical axis of each of said light source sections is represented by H, and said light source unit is designed so as to satisfy a relationship given by:

$|H/L|<0.27$.

2. A video display apparatus comprising:
a light source unit having a plurality of light source sections each having a light source formed from one of a semiconductor light emitting element and a white light lamp and a coupling optical element for converting light emitted from said light source into substantially parallel light, said light source unit including a condenser lens being operable to condense said light from said light source sections having passed through each said coupling optical element at a predetermined focus position on an optical axis of illuminating said video display apparatus, wherein said light source sections are disposed on a plane in said light source unit such that said light from said light source sections is condensed at said predetermined focus position by said condenser lens;
an integrator disposed at the predetermined focus position of said light source unit for equalizing an intra-plane light intensity distribution of said light emitted from said light source unit; and
a light valve of a substantially rectangular shape upon which said light whose intra-plane light intensity distribution has been equalized by said integrator is irradiated, and said light source unit further includes a condenser lens, and said light source sections are disposed on a plane in said light source unit such that said light from said light source sections is condensed at said predetermined focus position by said condenser lens, and
wherein a maximum value of said light valve in its minor side direction at an angle of said light irradiated on said light valve with respect to said optical axis of said video display apparatus is represented by $\theta_1$, a maximum value of said light valve in its major side direction is represented by $\theta_2$, a length of said light valve in its minor side direction is represented by $L_1$, a length of said light valve in its major side direction is represented by $L_2$, an effective numerical aperture of said condenser lens is represented by $NA_c$, and said light source unit is designed such that an area S of light emitting regions of said light source sections satisfies a relationship given by:

$S<(L_1 \times \theta_1/NA_c) \times (L_2 \times \theta_2/NA_c)$.

3. A video display apparatus comprising:
a light source unit having a plurality of light source sections each having a light source formed from one of a semiconductor light emitting element and a white light lamp and a coupling optical element for converting light emitted from said light source into substantially parallel light, said light source unit being operable to condense said light from said light source sections having passed through each said coupling optical element at a predetermined focus position;
an integrator disposed at the predetermined focus position of said light source unit for equalizing an intra-plane light intensity distribution of said light emitted from said light source unit; and
a light valve of a substantially rectangular shape upon which said light whose intra-plane light intensity distribution has been equalized by said integrator is irradiated, wherein said light source sections are disposed on a semi-sphere centered at said predetermined focus position so that said light from said light source sections is condensed at said predetermined focus position.

4. The video display apparatus according to claim 2, wherein a distance from said light source sections to said predetermined focus position is represented by L, a maximum distance from said optical axis of said video display apparatus to an optical axis of each of said light source sections is represented by H, and said light source unit is designed so as to satisfy a relationship given by:

$$|H/L|<0.27.$$

5. The video display apparatus according to claim 3, wherein a maximum value of said light valve in its minor side direction at an angle of said light irradiated on said light valve with respect to said optical axis of said video display apparatus is represented by $\theta_1$, a maximum value of said light valve in its major side direction is represented by $\theta_2$, a length of said light valve in its minor side direction is represented by $L_1$, a length of said light valve in its major side direction is represented by $L_2$, a distance from said light source sections to said predetermined focus position is represented by L, a maximum distance from said optical axis of said video display apparatus to an optical axis of each of said light source sections is represented by H, and said light source unit is designed so that an area S of light emitting regions of said light source sections satisfies a relationship given by:

$$S \leq (L_1 \times \theta_1 \times L/H) \times (L_2 \times \theta_2 \times L/H).$$

6. The video display apparatus according to claim 1, wherein said light source is formed from one of a light emitting diode and a laser diode.

7. The video display apparatus according to claim 1, wherein said plurality of light source sections each include a reflecting mirror for respectively reflecting light emitted from said plurality of light source sections in a single direction.

8. A video display apparatus comprising:

a light source unit having a plurality of light source sections each having a light source formed from one of a semiconductor light emitting element and a white light lamp and a coupling optical element for converting light emitted from said light source into substantially parallel light, said light source unit having a condenser lens to condense said light from said light source sections having passed through each said coupling optical element at a predetermined focus position on an optical which said light whose intra-plane light intensity distribution has been equalized by said integrator is irradiated, wherein said light source sections are disposed on a semi-sphere centered at said predetermined focus position so that said light from said light source sections is condensed at said predetermined focus position.

9. A video display apparatus comprising:

a light source unit having a plurality of light source sections each having a light source formed from one of a semiconductor light emitting element and a white light lamp and a coupling optical element for converting light emitted from said light source into substantially parallel light, said light source unit having a condenser lens to condense said light from said light source sections having passed through each said coupling optical element at a predetermined focus position on an optical axis of illuminating said video display apparatus;

an integrator disposed at the predetermined focus position of said light source unit for equalizing an intra-plane light intensity distribution of said light emitted from said light source unit;

a light valve of a substantially rectangular shape upon which said light whose intra-plane light intensity distribution has been equalized by said integrator is irradiated, and a polarization conversion element disposed at one of a position between said light source unit and said integrator, a position inside said integrator, and a position between said integrator and said light valve.

* * * * *